US011770489B2

(12) United States Patent
Shimakawa

(10) Patent No.: US 11,770,489 B2
(45) Date of Patent: Sep. 26, 2023

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Yasunori Shimakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/590,484

(22) Filed: Feb. 1, 2022

(65) Prior Publication Data
US 2022/0256048 A1 Aug. 11, 2022

(30) Foreign Application Priority Data
Feb. 8, 2021 (JP) ................... 2021-018367

(51) Int. Cl.
*H04N 1/00* (2006.01)
*H04N 1/32* (2006.01)
*G06V 30/12* (2022.01)

(52) U.S. Cl.
CPC ....... *H04N 1/00824* (2013.01); *G06V 30/127* (2022.01); *H04N 1/0048* (2013.01); *H04N 1/32101* (2013.01)

(58) Field of Classification Search
CPC ............. H04N 1/00824; H04N 1/0048; H04N 1/32101; G06V 30/127; G06F 18/00
See application file for complete search history.

(56) References Cited

U.S. PATENT DOCUMENTS

2021/0006677 A1* 1/2021 Ushinohama ...... H04N 1/00474
2022/0019785 A1* 1/2022 Iwasaki ................ G06V 30/412

FOREIGN PATENT DOCUMENTS

JP 2013109726 A 6/2013

* cited by examiner

*Primary Examiner* — Iriana Cruz
(74) *Attorney, Agent, or Firm* — Canon U.S.A., Inc. IP Division

(57) ABSTRACT

An image processing apparatus includes a reading unit configured to read a document, a processing unit configured to perform character recognition processing of recognizing characters included in an image of the document read by the reading unit, an identification unit configured to identify transfer destination information regarding a transfer destination and a transfer amount from a result obtained by the character recognition processing performed by the processing unit, a transmission unit configured to transmit the transfer destination information regarding the transfer destination and the transfer amount which are identified by the identification unit, a storage unit configured to store the transfer destination information regarding the transfer destination, and an object display unit configured to display an object to call the transfer destination information regarding the transfer destination stored in the storage unit.

9 Claims, 24 Drawing Sheets

FIG.4A

| | | |
|---|---|---|
| ← BANKING SERVICE AUTHENTICATION SETTINGS | | |
| USER ID | : CanTaro@canDelive | ~401 |
| PASSWORD | : ●●●●●●●● | ~402 |
| REGISTERED NAME | : XX DEPARTMENT | ~403 |
| | LOG IN | ~404 |

FIG.4B

| | | |
|---|---|---|
| ← BANKING SERVICE AUTHENTICATION SETTINGS | | |
| USER ID | : ✸✸✸✸✸✸✸✸ | ~405 |
| PASSWORD | : ✸✸✸✸✸✸✸✸ | ~406 |
| REGISTERED NAME | : XX DEPARTMENT | ~407 |
| | LOG OUT | ~408 |

FIG.6A

DEVICE SERIAL NO: abcd0101

APPLICATION MANAGEMENT

BANK TRANSFER > BANKING SERVICE AUTHENTICATION SETTINGS
BANKING SERVICE AUTHENTICATION SETTINGS

SET FOLLOWING INFORMATION AND CLICK [OK]

| USER ID | CanTaro@canDelive.co.jp | [LOG IN] |
| PASSWORD | ●●●●●●●● | |
| REGISTERED NAME | XX DIVISION | [LOG IN] |

FIG.6B

DEVICE SERIAL NO: abcd0101

APPLICATION MANAGEMENT

BANK TRANSFER > BANKING SERVICE AUTHENTICATION SETTINGS
BANKING SERVICE AUTHENTICATION SETTINGS

SET FOLLOWING INFORMATION AND CLICK [OK]

| USER ID | ●●●●●●●●●● | [LOG OUT] |
| PASSWORD | ●●●●●●●●●● | |
| REGISTERED NAME | XX DIVISION | [LOG OUT] |

FIG.6C

DEVICE SERIAL NO: abcd0101

APPLICATION MANAGEMENT

BANK TRANSFER > BANKING SERVICE AUTHENTICATION SETTINGS
BANKING SERVICE AUTHENTICATION SETTINGS

AUTHENTICATION FAILED. CLICK [BACK].           [BACK]

FIG.10

OCTOBER 5, 2020
INVOICE NO: 20201027-008

INVOICE

EIJI INC.

IMECOM INC.
1-2-3, AABXBXCC, 000-0000

PLEASE PAY AMOUNT DESCRIBED BELOW.

Tel: 03-0000-0000
FAX: 03-0000-0000

TOTAL　　　　¥ 725,395-

PAYMENT DUE DATE: DECEMBER 20, 2020

| ITEM NUMBER AND ITEM NAME | QUANTITY | UNIT PRICE | AMOUNT |
|---|---|---|---|
| AXBCAXB | 1 | 506,000 | 506,000 |
| CCCBBBXXXAAA | 1 | 153,450 | 153,450 |
|  |  |  |  |
|  |  |  |  |
|  |  |  |  |
|  |  |  |  |
|  |  |  |  |
| | | SUBTOTAL | 659,450 |
| | | SALES TAX (10%, TAX EXCLUDED) | 65,945 |
| | | TOTAL | 725,395 |

THANK YOU FOR YOUR BUSINESS.

TRANSFER TO:
　CANNON BANK  OTA BRANCH  (SAVINGS) 00000000  IMECOM INC.

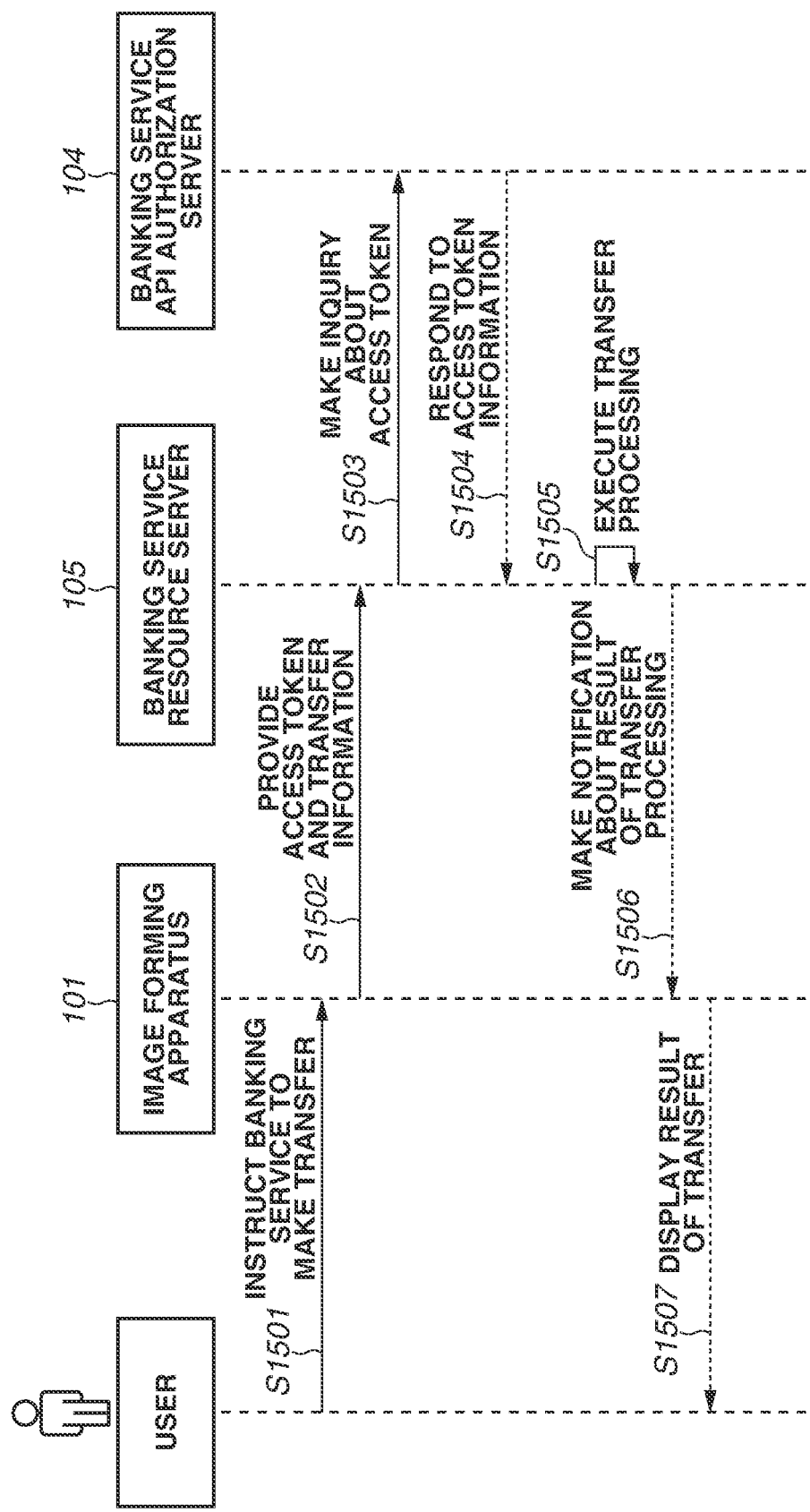

FIG.19

NOVEMBER 5, 2020
INVOICE NO: 20201127-003

INVOICE

EIJI INC.

IMECOM INC.
1-2-3, AABXBXCC, 000-0000

PLEASE PAY AMOUNT DESCRIBED BELOW.

Tel: 03-0000-0000
FAX: 03-0000-0000

TOTAL             ¥ 402,048-

PAYMENT DUE DATE: JANUARY 20, 2021

| ITEM NUMBER AND ITEM NAME | QUANTITY | UNIT PRICE | AMOUNT |
|---|---|---|---|
| CCCBBBXXXAAA | 1 | 402,048 | 402,048 |
|  |  |  |  |
|  |  |  |  |
|  |  |  |  |
|  |  |  |  |
|  |  |  |  |
|  |  | SUBTOTAL | 402,048 |
|  |  | SALES TAX (10%, TAX EXCLUDED) | 40,205 |
|  |  | TOTAL | 442,253 |

THANK YOU FOR YOUR BUSINESS.

TRANSFER TO:
　CANNON BANK  OTA BRANCH  (SAVINGS) 00000000  IMECOM INC.

FIG.21

| BANK TRANSFER PROCESSING | |
|---|---|
| TRANSFER SOURCE | : XX DEPARTMENT |

PROCESSING OF TRANSFERRING 402,04 YEN (300 YEN FOR SERVICE FEE) WILL BE EXECUTED

| BANK: CANNON BANK |
|---|
| BRANCH NAME: OTA BRANCH |
| ACCOUNT TYPE: SAVINGS |
| ACCOUNT NUMBER: 0000000 |

[ CANCEL ]  [ CONFIRM ]

FIG.23

| BANK TRANSFER PROCESSING | |
|---|---|
| REGISTERED BANK NAME | : CANNON BANK |
| DETECTED BANK NAME | : KENNON BANK |
| READ PART | |
| THANK YOU FOR YOUR BUSINESS.<br><br>TRANSFER TO:<br>CANNON BANK OTA BRANCH (SAVINGS) OOC | TO MAKE TRANSFER WITH REGISTERED BANK NAME, PLEASE PRESS "CONFIRM"<br>TO TRY AGAIN, PLEASE PRESS "CANCEL" |
| | CANCEL    CONFIRM |

IMAGE PROCESSING APPARATUS, CONTROL METHOD FOR IMAGE PROCESSING APPARATUS, AND STORAGE MEDIUM

BACKGROUND

Field of the Disclosure

The present disclosure relates to an image processing apparatus, a control method for the image processing apparatus, and a storage medium.

Description of the Related Art

There is known a technique of capturing an image of a document with its transfer destination described on it, recognizing characters in the captured image, extracting information regarding the transfer destination, using the information for transfer processing, and thereby saving a user the trouble of entering information regarding a transfer.

Japanese Patent Application Laid-Open No. 2013-109726 discusses a technique of recognizing characters in a captured image, extracting the financial institution name, the branch name, the account type, and the account number, and, if the contents thereof are matched with information stored in a financial institution information database that has been preliminarily stored, performing transfer processing using these pieces of information.

The technique discussed in Japanese Patent Application Laid-Open No. 2013-109726 enables use of transfer destination information regarding a transfer destination in performing transfer processing with a result obtained by character recognition processing, but users enter a transfer amount one digit by one digit manually.

SUMMARY

According to an aspect of the present disclosure, an image processing apparatus includes a reading unit configured to read a document, a processing unit configured to perform character recognition processing of recognizing characters included in an image of the document read by the reading unit, an identification unit configured to identify transfer destination information regarding a transfer destination and a transfer amount from a result obtained by the character recognition processing performed by the processing unit, a transmission unit configured to transmit the transfer destination information regarding the transfer destination and the transfer amount which are identified by the identification unit, a storage unit configured to store the transfer destination information regarding the transfer destination, and an object display unit configured to display an object to call the transfer destination information regarding the transfer destination stored in the storage unit.

Further features of the present disclosure will become apparent from the following description of exemplary embodiments with reference to the attached drawings.

BRIEF DESCRIPTION OF THE DRAWINGS

FIGS. 4A and 4B are diagrams each illustrating a login screen for banking service authentication.

FIGS. 6A to 6C are diagrams each illustrating a screen for the banking service authentication via a browser.

FIG. 10 is a diagram illustrating an invoice according to one or more aspects of the present disclosure.

FIG. 15 is a flowchart illustrating the procedure of the bank transfer processing.

FIG. 19 is a diagram illustrating an invoice according to one or more aspects of the present disclosure.

FIG. 21 is a diagram illustrating a confirmation screen before a transfer is made in the processing of making a transfer to the registered destination.

FIG. 23 is a diagram illustrating a screen for confirming a bank name detected in the processing of re-selecting the bank account information.

DESCRIPTION OF THE EMBODIMENTS

Some exemplary embodiments of the present disclosure will be described in detail below with reference to the accompanying drawings. The following exemplary embodiments do not limit the claimed disclosure, and all combinations of features described in the exemplary embodiments are not used in the solution of an issue of the present disclosure.

A first exemplary embodiment of the present disclosure will be described.

Figure 1:
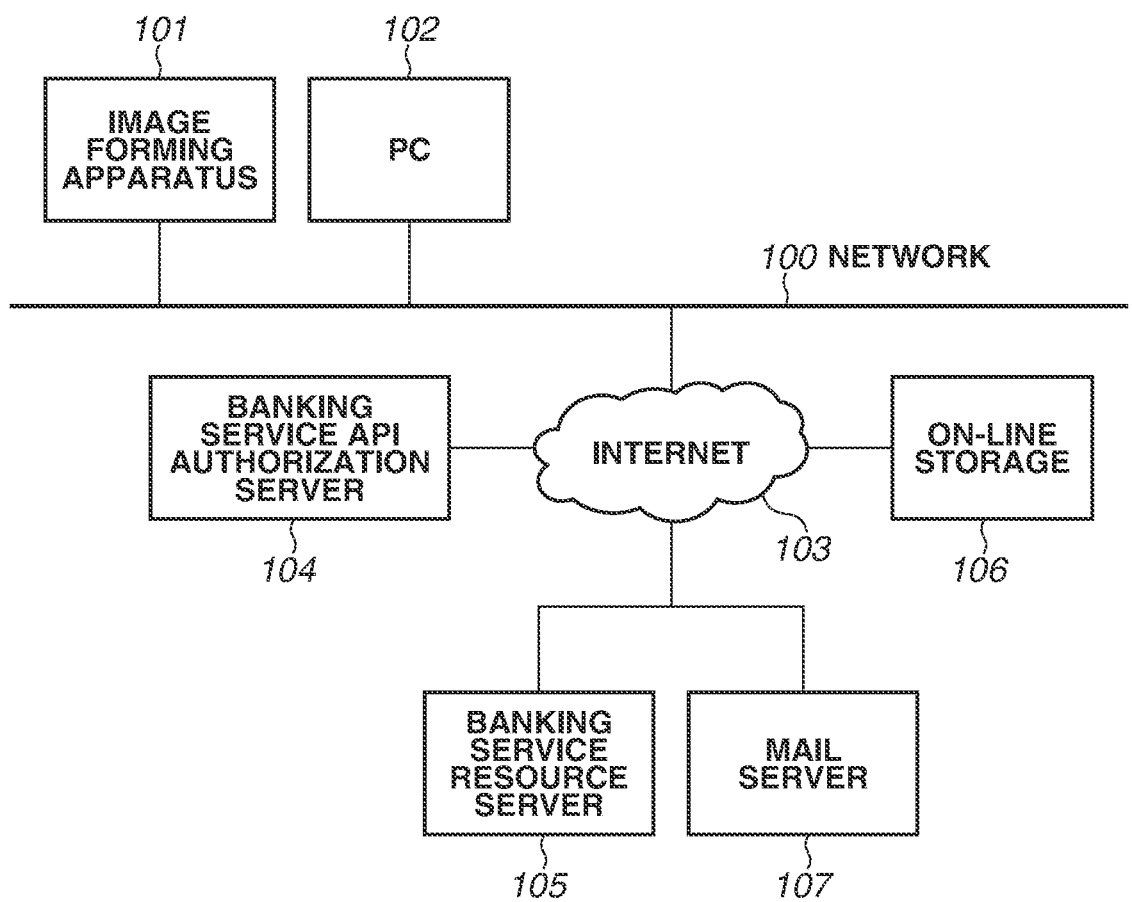
FIG. 1 is a diagram illustrating a network configuration.

FIG. 1 is a block diagram regarding a network configuration according to the present disclosure.

An image forming apparatus 101 is an example of image processing apparatuses. In the present exemplary embodiment, the image forming apparatus 101 is a multi-function peripheral (MFP).

The image forming apparatus 101 is communicatable with a personal computer (PC) 102 via a network 100. The network 100 is connected to the Internet 103.

The PC 102 is used to acquire the information about a status of the image forming apparatus 101 to display, make settings of the image forming apparatus 101, and transmit print data to the image forming apparatus 101.

A banking service application programming interface (API) authorization server 104, a banking service resource server 105, an on-line storage 106, and a mail server 107 are connected to the Internet 103.

The banking service API authorization server 104 authorizes use of a banking service API.

The banking service resource server 105 is used for services such as bank transfer and issuance of an account activity statement.

The on-line storage 106 stores images and setting information.

The mail server 107 transmits/receives e-mails.

The image forming apparatus 101, the PC 102, the banking service API authorization server 104, the banking service resource server 105, the on-line storage 106, and the mail server 107 are communicatable with one another.

The image forming apparatus 101 reads documents, and transmits image data obtained by the reading to the PC 102 or the on-line storage 106. In addition, the image forming apparatus 101 reads a document, attaches image data obtained by the reading to an e-mail, and transmits the e-mail to the mail server 107.

The PC 102 allows setting or updating setting values of the image forming apparatus 101 using a Hypertext Transfer Protocol (HTTP).

In some embodiments, the network 100 that allows transmitting image data is wirelessly connected to an access point (not illustrated). The image data in the present exemplary embodiment is electronic data. Specifically, the image data is not limited to raw electronic data in digital form, and may be electronic data compatible with an image format such as a Tag Image File Format (TIFF) or a Joint Photographic Experts Group (JPEG) format, or electronic data compatible with a Portable Document Format (PDF). The image forming apparatus 101 includes a character recognition unit, which has a function of recognizing characters from image data obtained by reading a document and outputting character data.

Figure 2:
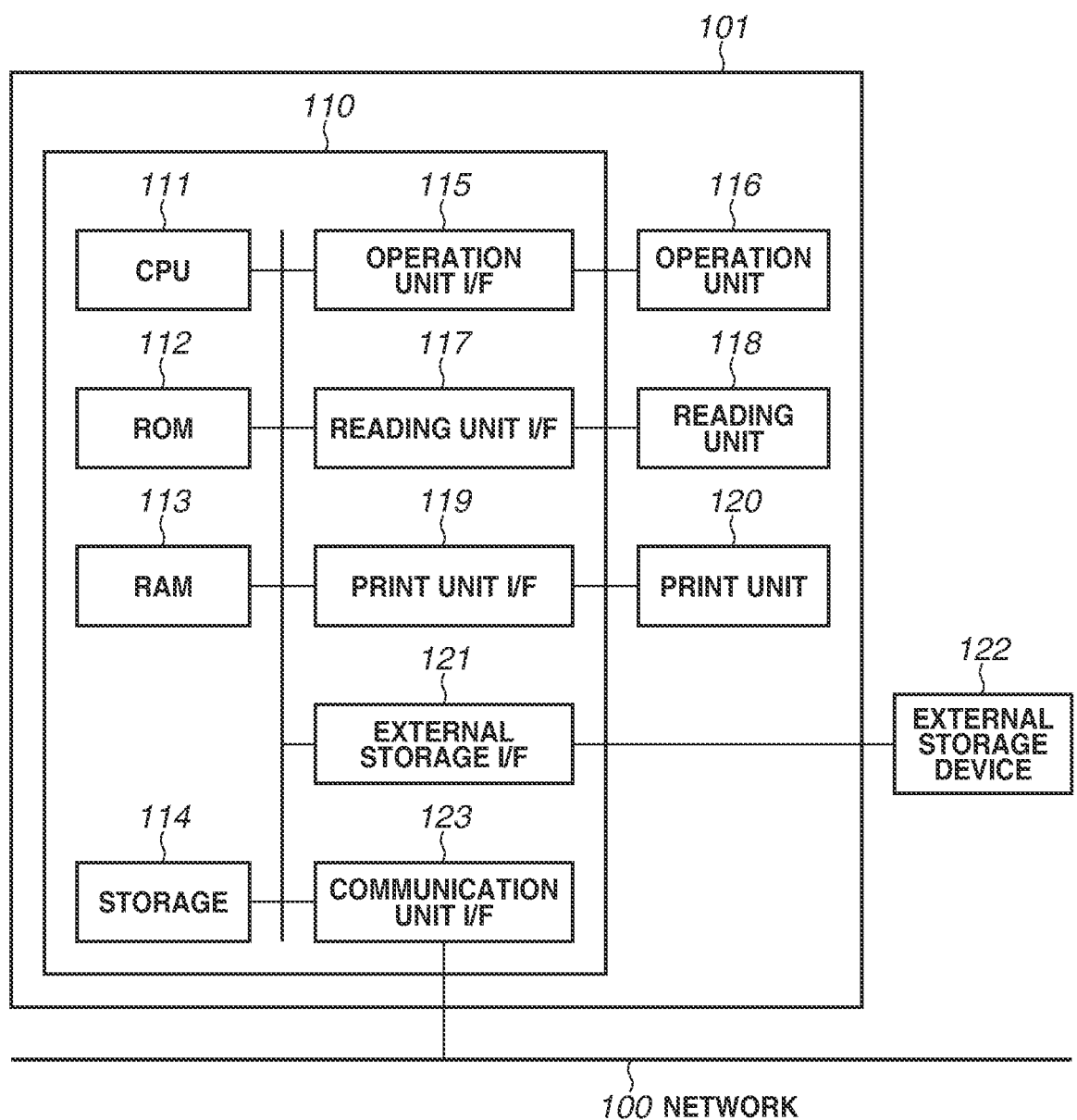
FIG. 2 is a diagram illustrating the configuration of an image processing apparatus.

FIG. 2 is a block diagram illustrating a configuration of the image forming apparatus 101.

The image forming apparatus 101 includes a control unit 110, an operation unit 116, a reading unit 118, and a print unit 120. The control unit 110 includes a central processing unit (CPU) 111, a read-only memory (ROM) 112, a random-access memory (RAM) 113, a storage 114, an operation unit interface (I/F) 115, a reading unit I/F 117, a print unit I/F 119, an external storage/F 121, and a communication unit I/F 123.

The CPU 111 controls operations of the image forming apparatus 101.

The CPU 111 loads programs stored in the ROM 112 or the storage 114 to the RAM 113 to run. The programs include, for example, a control program. The CPU 111 runs control programs to perform various kinds of control such as reading control and print control.

The ROM 112 stores programs to be run by the CPU 111. The ROM 112 also stores boot programs and font data.

The RAM 113 is a main memory of the CPU 111. The RAM 113 is used as a work area of the CPU 111, and a temporary storage area for loading programs stored in both the ROM 112 and the storage 114. The RAM 113 is also used for temporarily storing image data.

The storage 114 stores image data, print data, address books, shortcuts, various kinds of programs, and various kinds of setting information. In the present exemplary embodiment, it is assumed that the storage 114 is a flash memory, but an auxiliary memory such as a solid state drive (SSD), a hard disk drive (HDD), and an embedded MultiMedia Card (eMMC) is usable.

The operation unit I/F 115 connects the operation unit 116 and the control unit 110 to each other. The operation unit 116 includes hardware keys and a touch panel. The touch panel is a display with a touch panel sheet affixed on it. The operation unit 116 accepts operations from a user via hardware keys, and displays screens via the touch panel.

The reading unit I/F 117 connects the reading unit 118 and the control unit 110 to each other. The reading unit 118 reads an image of a document and generates image data. The image data generated by the reading unit 118 undergoes character recognition processing, is transmitted to external devices, or is printed on a print sheet.

The print unit I/F 119 connects the print unit 120 and the control unit 110 to each other. The CPU 111 transfers image data to be printed (image data to print) to the print unit 120 via the print unit I/F 119. The print unit 120 prints an image on a sheet fed from a feed cassette.

Images may be printed in an electrophotographic method using toner, or an ink-jet method using ink.

The external storage I/F 121 connects an external storage device 122 and the control unit 110 to each other. The CPU 111 stores image data in the external storage device 122 via the external storage I/F 121. In the present exemplary embodiment, it is assumed that the external storage I/F 121 is a universal serial bus (USB), and the external storage device 122 is a USB memory. In addition, the external storage device 122 may be a Secure Digital (SD) Card.

The control unit 110 is connected to the network 100 via the communication unit I/F 123. The network 100 is, for example, a local area network (LAN).

The communication unit I/F 123 controls transmission/reception of data via the network 100. For example, the image forming apparatus 101 transmits, via the communication unit I/F 123, various kinds of setting information about the interior of the apparatus to the PC 102, e-mails to the mail server 107, and image data to the on-line storage 106.

In addition, the image forming apparatus 101 is connected to the banking service API authorization server 104 via the communication unit I/F 123, and acquires the banking service APs authorization code provided by the banking service resource server 105. The image forming apparatus 101 is also connected to the banking service resource server 105 via the communication unit I/F 123, and gives the banking service API's authorization code to perform banking service with the banking service API. Various kinds of setting information to acquire the banking service API's authorization code are registered or changed on the image forming apparatus 101 accessed through the HTTP from the PC 102.

The PC 102 includes, although not illustrated, a CPU, a RAM, a ROM, a storage, a communication I/F, and an operation unit. The banking service API authorization server 104, the banking service resource server 105, the on-line storage 106, and the mail server 107 each have a hardware configuration similar to that of the PC 102.

Figure 3:
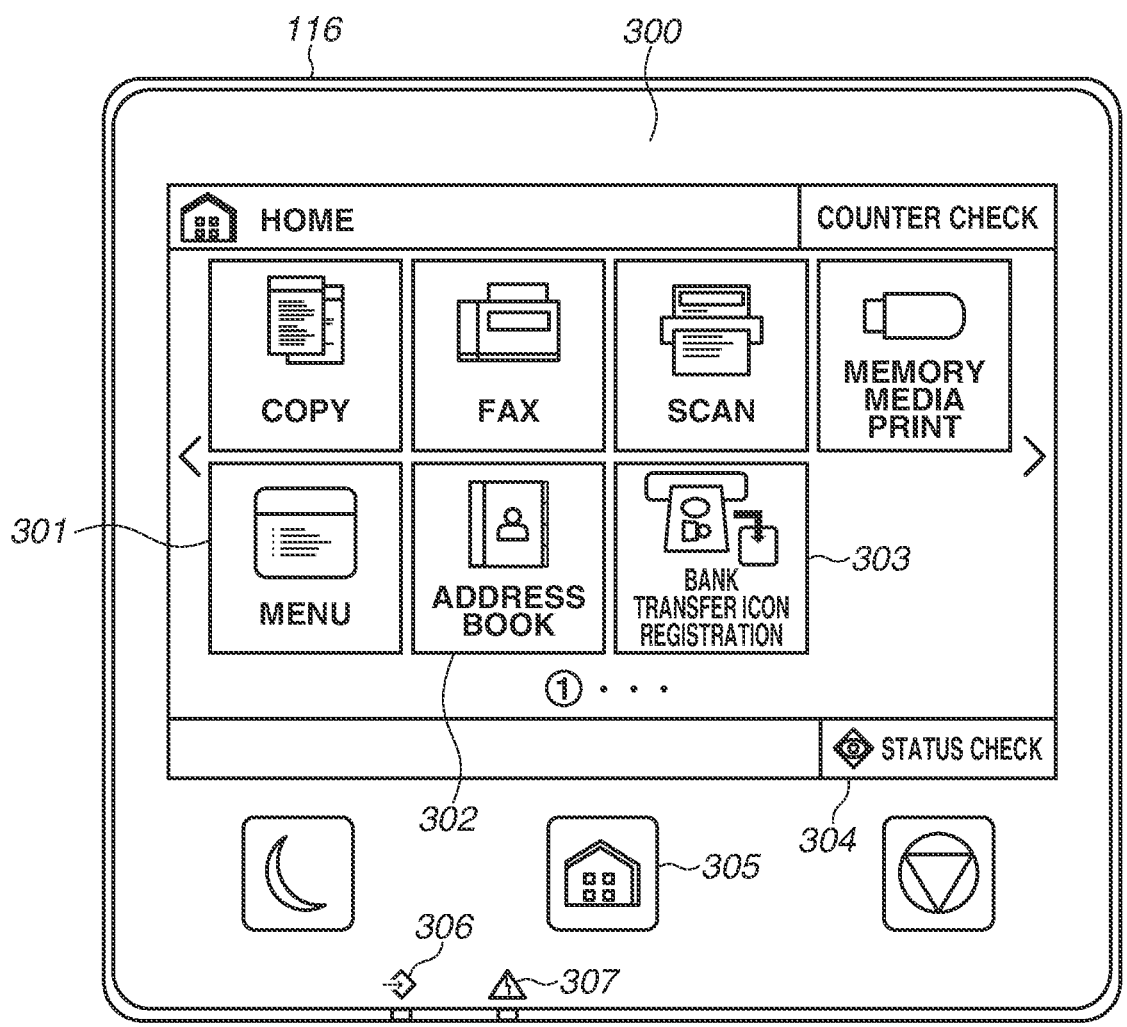
FIG. 3 is a diagram illustrating an operation unit of the image processing apparatus.

FIG. 3 is a diagram illustrating the operation unit 116. The operation unit 116 includes a touch panel 300, a data light emitting diode (LED) 306, and an error LED 307.

The home screen, displayed immediately after activation of the image forming apparatus 101, is displayed on the touch panel 300 illustrated in FIG. 3. The home screen is a screen for instructing the image forming apparatus 101 to perform its functions. For example, a copy button is displayed on the home screen. The copy button is a button for using a copy function for printing images on the print unit 120 based on image data generated by the reading unit 118 reading documents. In addition, a fax button is displayed on the home screen. The fax button is a button for using a fax function for transmitting image data generated by the reading unit 118 reading documents on a not-illustrated modem. A scan button is also displayed on the home screen. The scan button is a button for using a transmission function for transmitting image data generated by the reading unit 118 reading documents via the communication I/F 123. The transmission function includes an e-mail function for transmitting e-mails with image data attached on it, and a folder transmission function for transmitting image data to designated folders. Additionally, a memory media print button is displayed on the home screen. The memory media print button is a button for printing images on the print unit 120 based on image data stored in the external storage device 122 such as a USB memory. Besides the above-mentioned buttons, a menu button 301, an address book button 302 for calling and displaying an address book, and a bank transfer icon registration button 303 for making a setting of a transfer destination of a bank transfer and other settings are displayed on the home screen.

A home key 305 is a hardware key, and is a button for switching a screen being displayed to the home screen.

The data LED 306 notifies the user that the image forming apparatus 101 is transmitting data by blinking during transmission of data.

The error LED 307 blinks when an error occurs in the image forming apparatus 101.

FIGS. 4A and 4B are diagrams each illustrating a setting screen for registering user information about a transfer source in the image forming apparatus 101 in making a transfer on the operation unit 116.

The screen illustrated in FIG. 4A is displayed in response to a selection of the menu button 301 illustrated in FIG. 3.

On the screen illustrated in FIG. 4A, a registered user identification (ID) 401 and a registered password 402 (one example of authentication information) are entered to use the banking service. While the user ID remains to be displayed after completion of entry, the displayed password 402 is hidden. A name registered for the banking service is entered in the field of a registered name 403.

Figure 7:
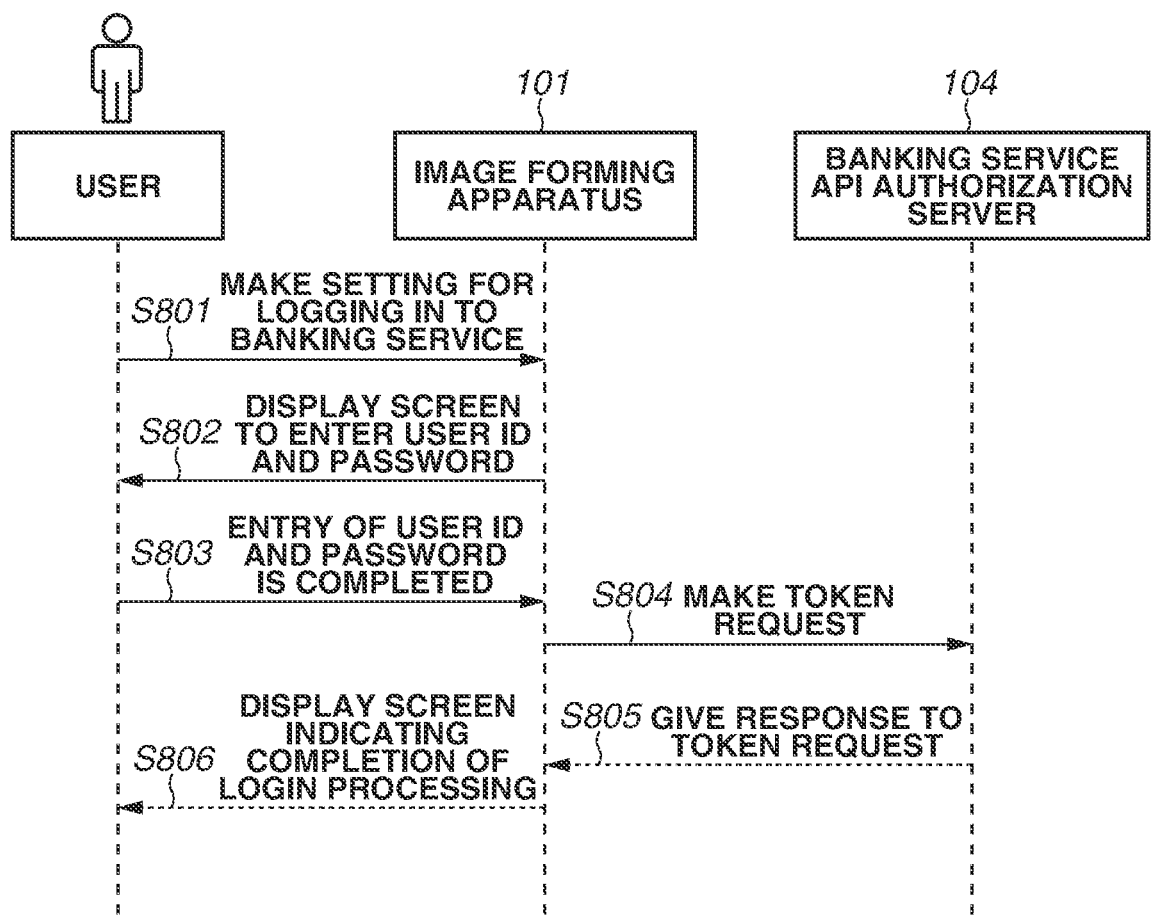
FIG. 7 is a flowchart illustrating the procedure of logging in to banking service.

In response to a selection of a login button 404, the image forming apparatus 101 performs authentication processing following a sequence in FIG. 7. In the authentication processing, the image forming apparatus 101 performs authentication with the banking service API authorization server 104.

In response to the success of the authentication, the screen illustrated in FIG. 4A appears, and a user ID 405 and a password 406 are hidden, and the registered name is displayed.

In response to a selection of a logout button 408, the screen illustrated in FIG. 4A is displayed, and the user ID 401, the password 402, and the registered name 403 are cleared.

Figure 5:
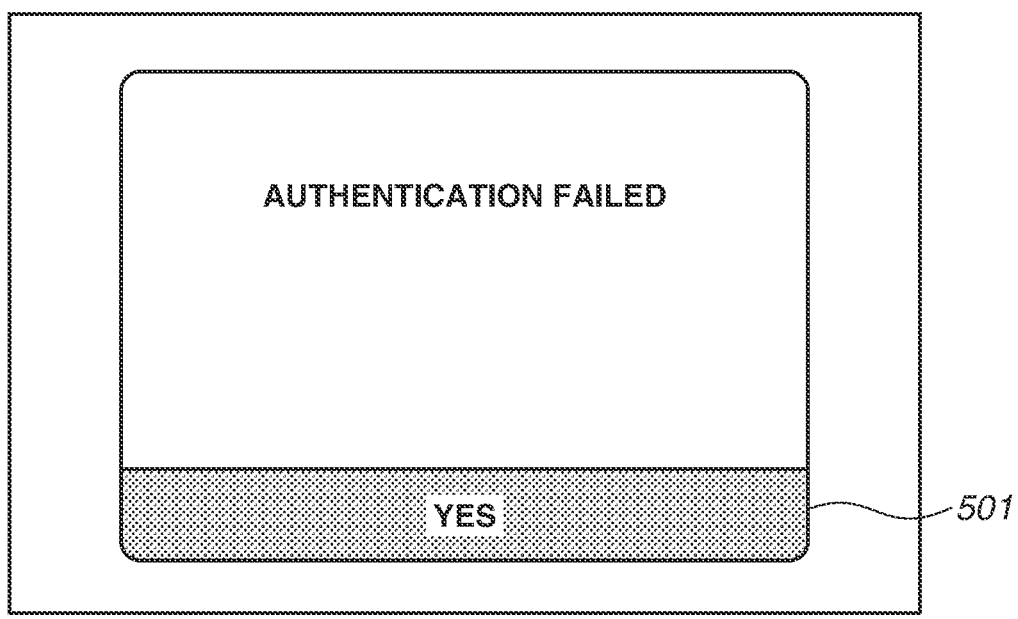
FIG. 5 is a diagram illustrating a screen displayed when login for the banking service authentication fails.

If the authentication fails, a screen illustrated in FIG. 5 is displayed on the operation unit 116. When a "YES" button 501 in FIG. 5 is selected, the screen illustrated in FIG. 4A is displayed on the operation unit 116.

Information to be entered on the screen illustrated in FIG. 4A that is registered for using the banking service is preliminarily set by the PC 102 connected to the image forming apparatus 101 using a browser of the PC 102.

FIG. 6A illustrates an example of a setting screen for performing an operation similar to that performed on the screen illustrated in FIG. 4A using the PC 102. The user preliminarily enters a user ID, a password, and a registered name via such a screen, and selects the login button.

In response to a selection of the login button, the user ID, the password, and the registered name, which are entered by the user, are transmitted to the image forming apparatus 101 as a transmission destination via the network 100, and stored in the image forming apparatus 101. When receiving to store the user ID, the password, and the registered name, the image forming apparatus 101 performs the authentication processing following the sequence in FIG. 7. In the authentication processing, the image forming apparatus 101 performs authentication with the banking service API authorization server 104.

In response to the success of the authentication, a screen illustrated in FIG. 6B is displayed on a display device of the PC 102. On this screen, the user ID and the password are hidden and the registered name is displayed.

If the authentication fails, a screen illustrated in FIG. 6C is displayed on the display device of the PC 102.

FIG. 7 indicates a sequence carried out when the image forming apparatus 101 performs authentication with the banking service API authorization server 104. The following is a description of processing performed when the image forming apparatus 101 performs authentication based on information entered via the screen illustrated in FIG. 4A.

In step S801, a request for making a login setting for accessing the banking service is made. In step S802, the image forming apparatus 101 displays a screen for the user to enter the user ID and the password on the operation unit 116.

In step S803, the user ID 401 and the password 402 are entered, and the login button 404 is selected. In step S804, the image forming apparatus 101 then notifies the banking service API authorization server 104 of a token request including the user ID and the password set by the user.

In step S805, in response to a confirmation that the user ID and password of the token request are valid, the banking service API authorization server 104 transmits a response to the token request to the image forming apparatus 101.

Figure 8:
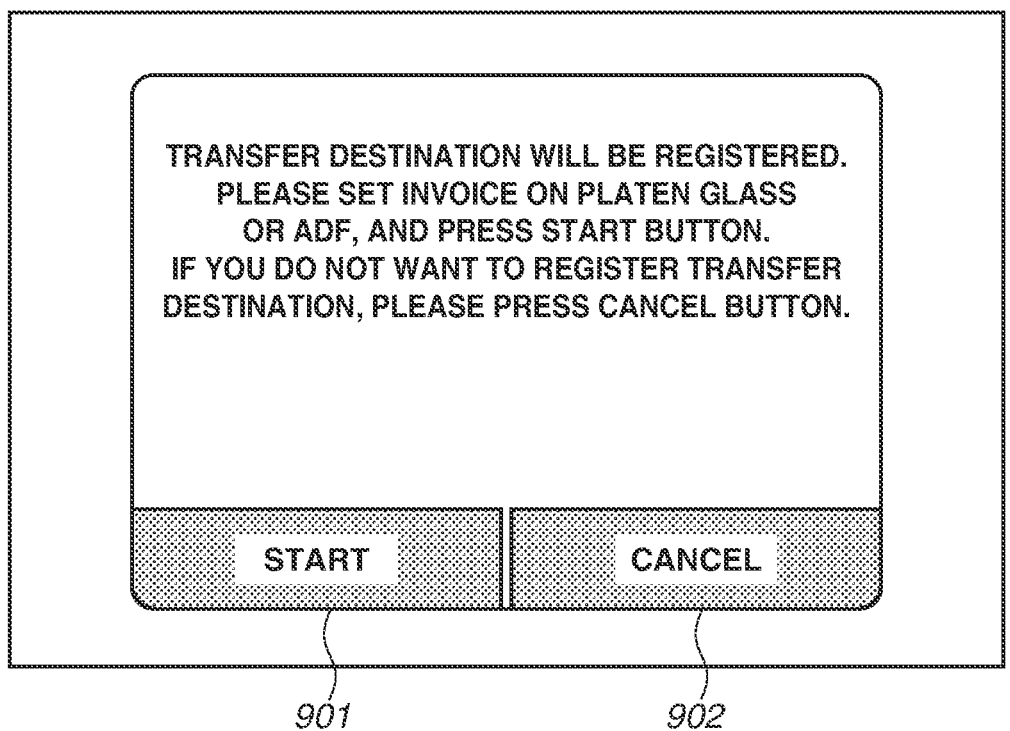
FIG. 8 is a diagram illustrating a screen for confirming application execution of registration of a transfer destination as a shortcut.

In step S806, the image forming apparatus 101 displays the result of the authentication based on the received response to the token request. When the banking service API authorization server confirms that the response to the token request is valid, the image forming apparatus 101 displays a screen illustrated in FIG. 8 on the operation unit 116. When a start button 901 is selected, the image forming apparatus 101 stores in the storage 114 of the image forming apparatus 101 an access token included in the response to the token request in association with the user information. After completion of the storage, the image forming apparatus 101 displays the screen illustrated in FIG. 4B on the operation unit 116, displays the screen illustrated in FIG. 6B on the PC 102, clears the password, and ends the processing.

On the other hand, if the banking service API authorization server cannot confirm that the response to the token request is valid, the image forming apparatus 101 displays the screen illustrated in FIG. 5 on the operation unit 116, and ends the processing.

Figure 9:
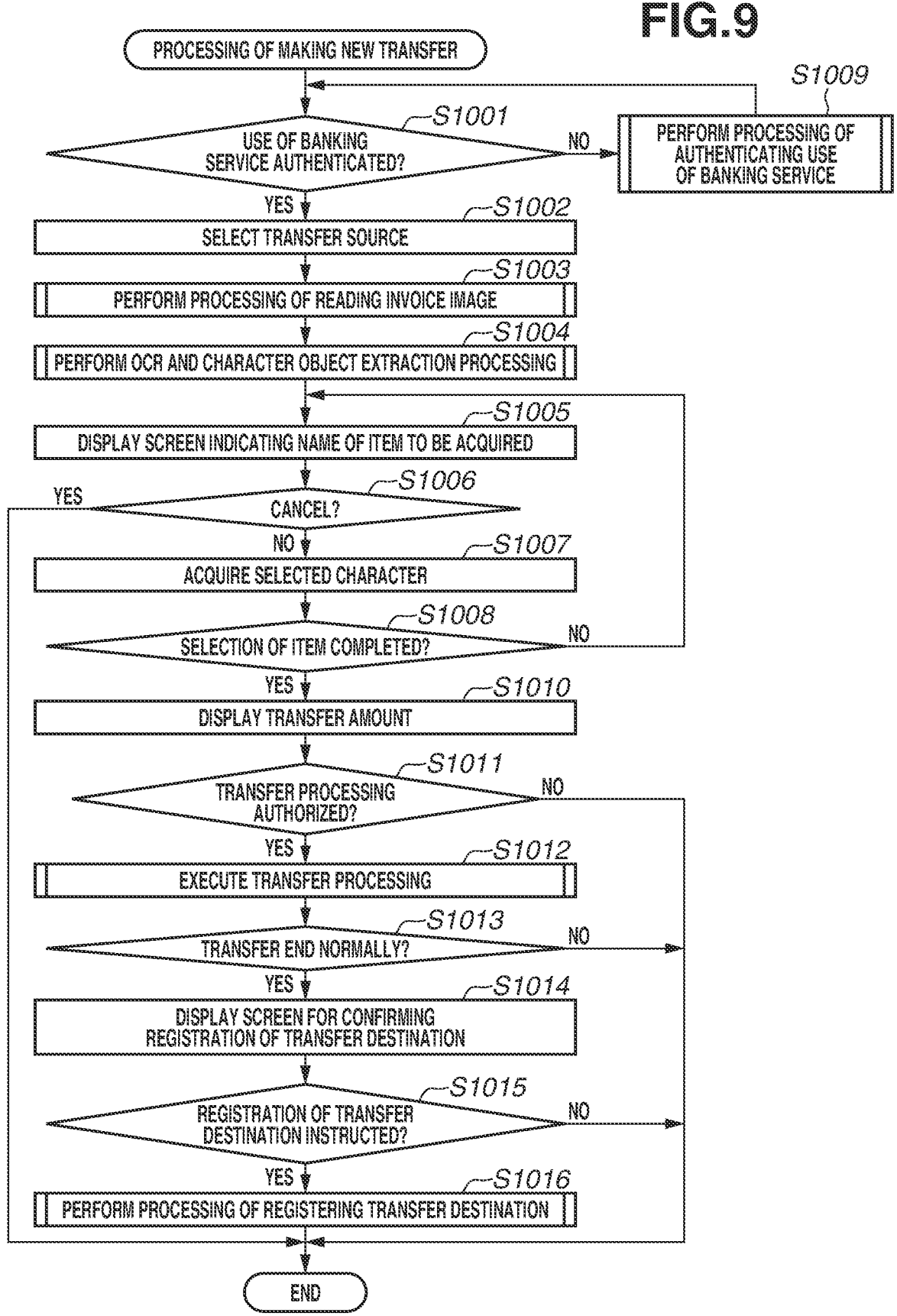
FIG. 9 is a flowchart illustrating the procedure of processing of registering anew transfer.

FIG. 9 is a flowchart illustrating the procedure of processing of making an initial transfer. The processing of the flowchart in FIG. 9 is performed by the CPU 111 loading programs stored in the ROM 112 to the RAM 113 and running them.

FIG. 10 illustrates an example of an invoice.

In step S1001, when the bank transfer icon registration button 303 illustrated in FIG. 3 is selected, the CPU 111 determines whether authentication by the banking service API authorization server 104 has been completed.

If the CPU 111 determines that the authentication by the banking service API authorization server 104 has been completed (YES in step S1001), the processing proceeds to step S1002. Otherwise (NO in step S1001), the processing proceeds to step S1009.

In step S1009, the CPU 111 causes the operation unit 116 to display the screen for setting authentication for use of the banking service illustrated in FIG. 4A.

Processing of displaying the screen for authenticating the banking service in step S1009 follows the procedure illustrated in FIG. 7. After completion of the processing of authentication for use, in step S1001, the CPU 111 checks again whether authentication for use of the banking service has been completed. Thereafter, the processing proceeds to step S1002.

In step S1002, the CPU 111 selects a transfer source registered by the user. When the selection is completed, the processing proceeds to step S1003.

In step S1003, the CPU 111 performs processing of reading an invoice image. Specifically, the CPU 111 causes the reading unit 118 to read an image of a document, and stores generated image data in the RAM 113. The processing then proceeds to step S1004.

In step S1004, the CPU 111 performs optical character recognition (OCR) and character object extraction processing on the image data stored in the RAM 113. Specifically, the CPU 111 performs the OCR on invoice image data stored in the RAM 113, searches the vicinity of each extracted character in the left-and-right direction, and sets characters within a predetermined distance as one character information (one character object). Thereafter, the processing proceeds to step S1005. In the present exemplary embodiment, the description centers on characters, but the character information extracted by the OCR may include numbers and/or symbols.

In step S1005, the CPU iii causes the operation unit 116 to sequentially display screens illustrated in FIGS. 11A, 11B, and 12A to 12C to acquire information for a bank transfer.

A plurality of pieces of extracted character information are displayed in a list on the screens illustrated in FIGS. 11A, 11B, and 12A to 12C. Part of the plurality of pieces of extracted character information may be displayed on the list, and the remaining character information may be displayed as a scroll key or a key for displaying the next list is selected. The user selects character information on each of the screens. The CPU 111 stores the character information selected on each of the screens illustrated in FIGS. 11A, 11B, and 12A to 12C as transfer information in the storage 114. Specifically, the CPU 111 stores the characters selected on the screen illustrated in FIG. 11A as a bank name in the storage 114. The CPU 111 also stores the characters selected on the screen illustrated in FIG. 11B as a branch name in the storage 114. The CPU 111 also stores the characters selected on the screen illustrated in FIG. 12A as an account type in the storage 114. The CPU 111 also stores the characters selected on the screen illustrated in FIG. 12B as an account number in the storage 114. The CPU 111 stores the characters selected on the screen illustrated in FIG. 12C as a transfer amount in the storage 114. The back button on each of the screens illustrated in FIGS. 11A, 11B, and FIGS. 12A to 12C is a button for reinstating display of a previous screen.

Figure 11A:
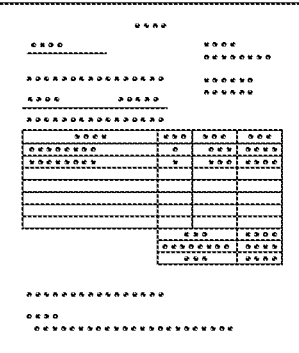
FIGS. 11A and 11B are diagrams each illustrating a selection screen in bank transfer processing.
Figure 13:
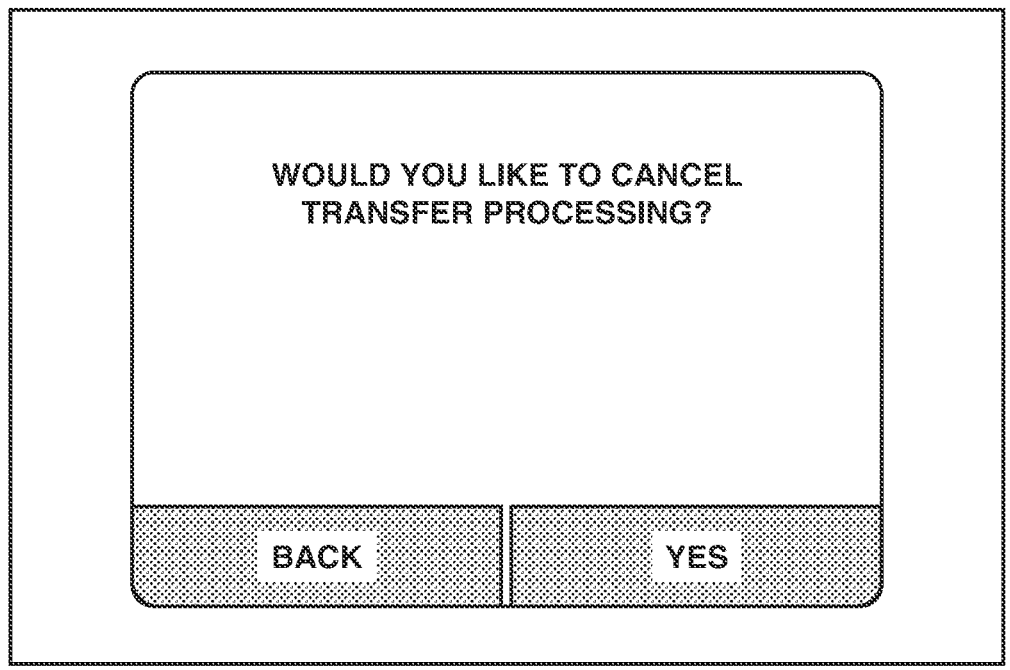
FIG. 13 is a diagram a cancel screen for cancelling the bank transfer processing.

To cancel the transfer processing, a "BACK" button is kept pressed until the screen for confirming cancellation of transfer processing illustrated in FIG. 13 is displayed. In step S1006, when "YES" is selected on the screen illustrated in FIG. 13, the CPU 111 cancels the transfer processing and ends the processing. If "NO" is selected on the screen in FIG. 13, the screen illustrated in FIG. 11A is displayed.

Figure 11B:
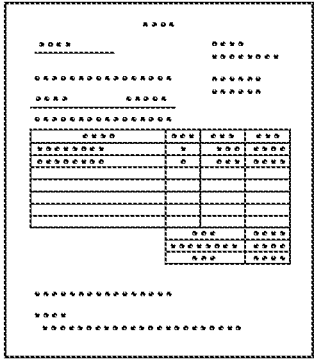
Figure 12A:
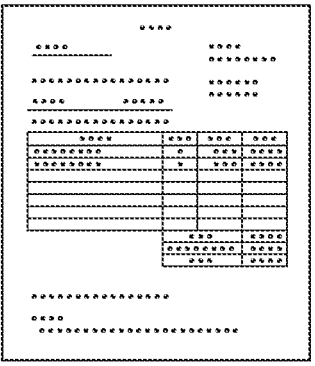
FIGS. 12A to 12C are diagrams each illustrating a selection screen in the bank transfer processing.
Figure 12B:
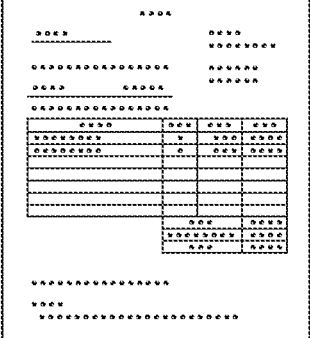
Figure 12C:
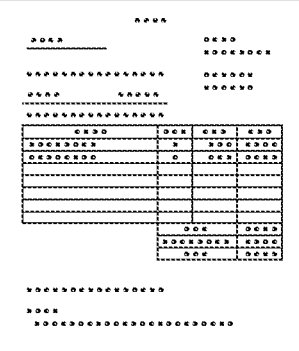

In step S1008, the CPU 111 determines whether the selection of items has been completed. If the confirm button on each of the screens illustrated in FIGS. 11A, 11B, and 12C is selected (NO in step S1008), the CPU 111 determines that the selection of items has not been completed, and the processing proceeds to step S1005. If the confirm button on the screen illustrated in FIG. 12C is selected (YES in step S1008), the CPU 111 determines that the selection of items has been completed, and the processing proceeds to step S1010.

Figure 14:
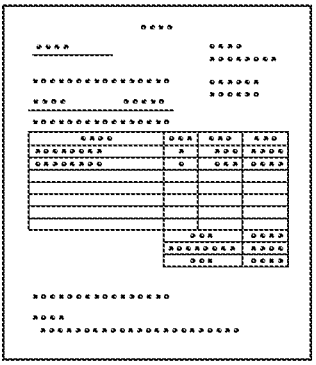
FIG. 14 is a diagram illustrating a confirmation screen before a transfer is made in the bank transfer processing.

In step S1010, the CPU 111 causes the operation unit 116 to display a confirmation screen illustrated in FIG. 14.

In step S1011, the CPU 111 determines whether the transfer processing has been authorized or cancelled.

If the confirm button is selected on the confirmation screen illustrated in FIG. 14 (YES in step S1011), the CPU 111 determines that the transfer processing has been authorized, and the processing proceeds to step S1012. If the cancel button is pressed on the screen illustrated in FIG. 14 (NO in step S1011), the CPU 111 determines that the transfer processing has been cancelled, and ends the processing without performing the transfer processing.

In step S1012, the CPU 111 performs the transfer processing illustrated in FIG. 15. The transfer processing will be described in detail below with reference to FIG. 15.

In step S1013, the CPU 111 determines whether the transfer processing has ended normally. If the CPU 111 determines that the transfer processing has ended normally (YES in step S1013), the processing proceeds to step S1014. Otherwise (NO in step S1013), the processing ends.

Figure 18A:
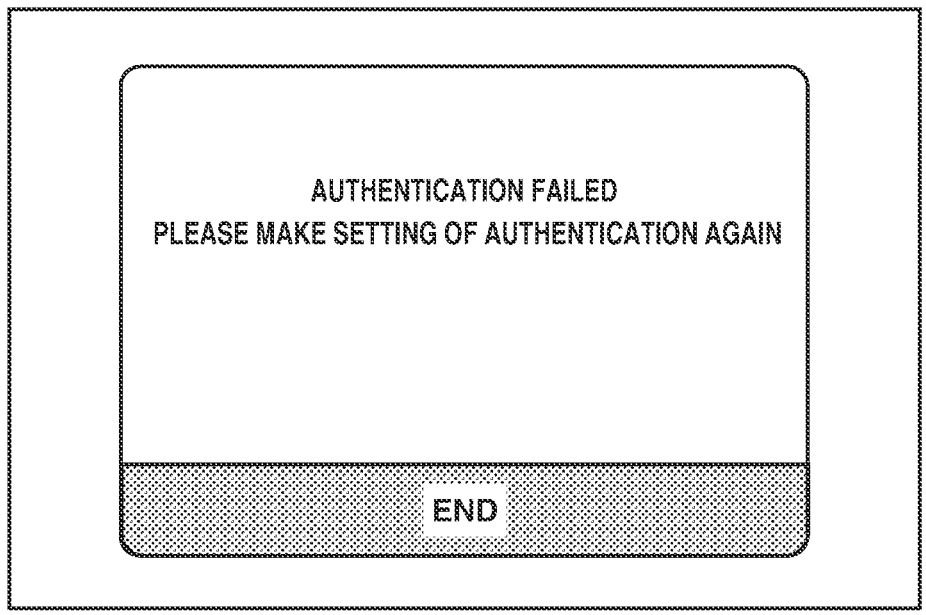
FIGS. 18A and 18B are diagrams each illustrating a screen displayed when authentication fails in the bank transfer processing.
Figure 18B:
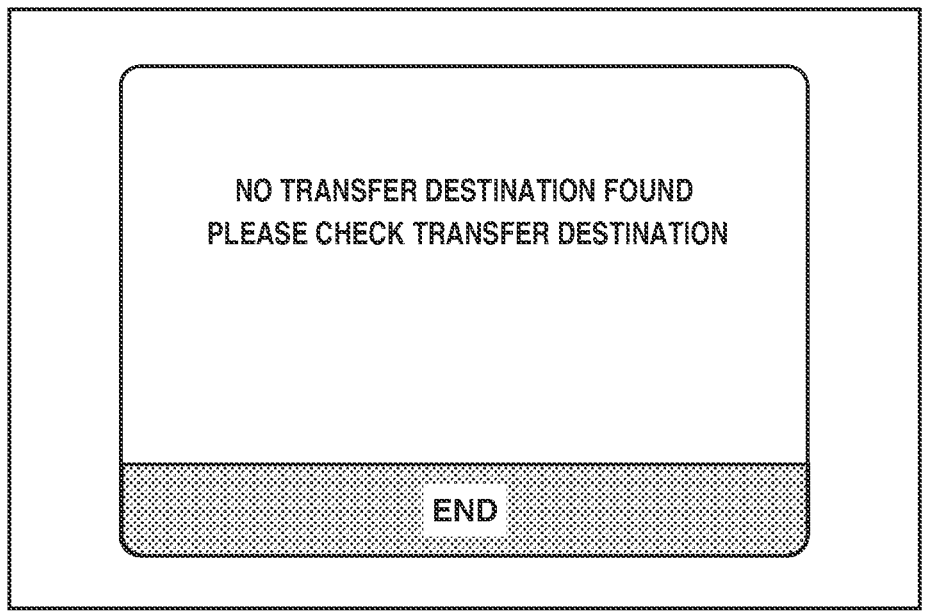

If the transfer processing has not ended normally, the CPU 111 may cause the operation unit 116 to display an error screen notifying that the transfer processing has not ended normally. For example, if the authentication processing fails, the CPU 111 may cause the operation unit 116 to display a screen illustrated in FIG. 18A indicating a failure of the authentication processing. If no corresponding transfer destination is found, the CPU 111 may cause the operation unit 116 to display a screen which is illustrated in FIG. 18B indicating that no corresponding transfer destination information is found.

Figures 16A, 16B:
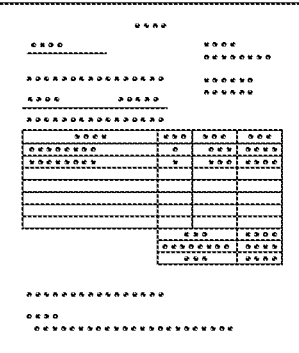
FIGS. 16A and 16B are diagrams each illustrating a screen for confirming registration of a destination in the bank transfer processing.

In step S1014, the CPU 111 causes the operation unit 116 to display a transfer information registration screen illustrated in FIG. 16A.

In step S1015, the CPU 111 determines whether registration of the transfer information has been instructed by the user. If the "YES" button is selected on the transfer information registration screen (YES in step S1015), the CPU 111 determines that the registration of the transfer processing has been instructed by the user, and the processing proceeds to step S1016. Otherwise, if a "NO" button is selected on the transfer information registration screen (NO in step S1015), the CPU 111 determines that registration of the transfer processing has not been instructed by the user, and ends the processing.

In step S1016, the CPU 111 performs processing of registering the transfer destination. Specifically, the CPU 111 causes the operation unit 116 to display a screen illustrated in FIG. 16B. The user enters a registered name via the screen illustrated in FIG. 16B using a software keyboard, which is not illustrated. If the "YES" button illustrated in FIG. 16B is selected, the CPU 111 stores in the storage 114 the registered name, the bank name, the branch name, the account type, the account number, the positions of the individual character strings, and the position of the character string of the transfer amount as transfer information. With this configuration, when displaying the home screen next time, the CPU 111 causes the operation unit 116 to display a shortcut icon 1701 (display an object) based on the information stored in the storage 114. Otherwise, if the "NO" button is selected on the screen illustrated in FIG. 16A, the CPU 111 ends the processing without registering the transfer information.

FIG. 15 illustrates the procedure of the transfer processing.

In step S1501, the confirm button is selected by the user on the transfer confirmation screen illustrated in FIG. 14. In step S1502, the image forming apparatus 101 notifies the banking service resource server 105 of a transfer instruction including an access token and transfer information. This access token is the access token preliminarily stored in the processing described in FIG. 7. The transfer information is the character information selected in each of the screens illustrated in FIGS. 11A, 11B, and 12A to 12C.

In step S1503, the banking service resource server 105 extracts the access token from the transfer instruction, and makes an inquiry about information about the access token to the banking service API authorization server 104.

In step S1504, the banking service API authorization server 104 returns the received information of the access token to the banking service resource server 105.

In step S1505, the banking service resource server 105 checks validity of the access token from the received information of the access token. If the access token is valid, the banking service resource server 105 performs the transfer processing. If the access token is invalid, the banking service resource server 105 does not perform the transfer processing.

In step S1506, the banking service resource server 105 notifies the image forming apparatus 101 of the result of the transfer processing.

In step S1507, the CPU 111 of the image forming apparatus 101 causes the operation unit 116 to display the result of the transfer processing notified by the banking service resource server 105.

Figure 17:
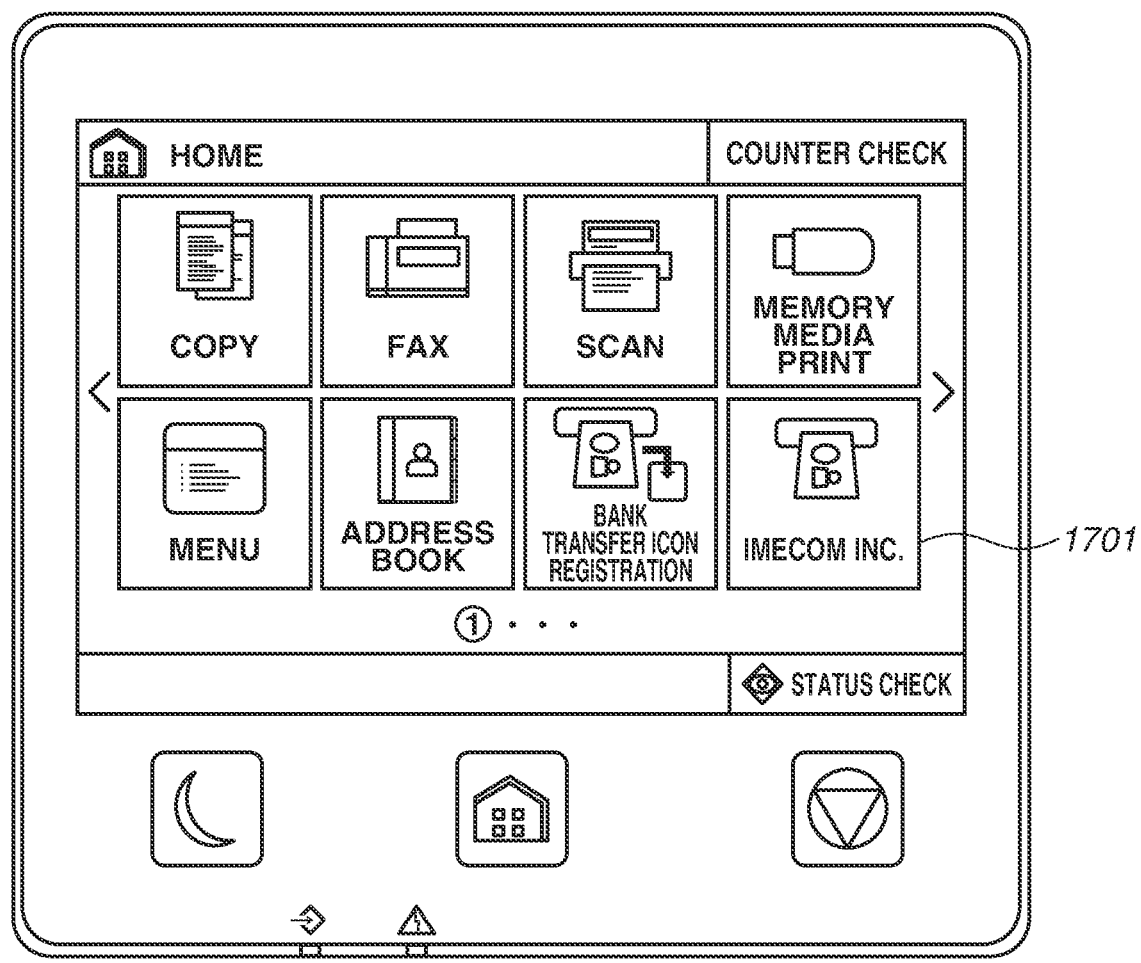
FIG. 17 is a diagram illustrating a state that shortcut has been registered in the operation unit of the image forming apparatus.
Figure 20:
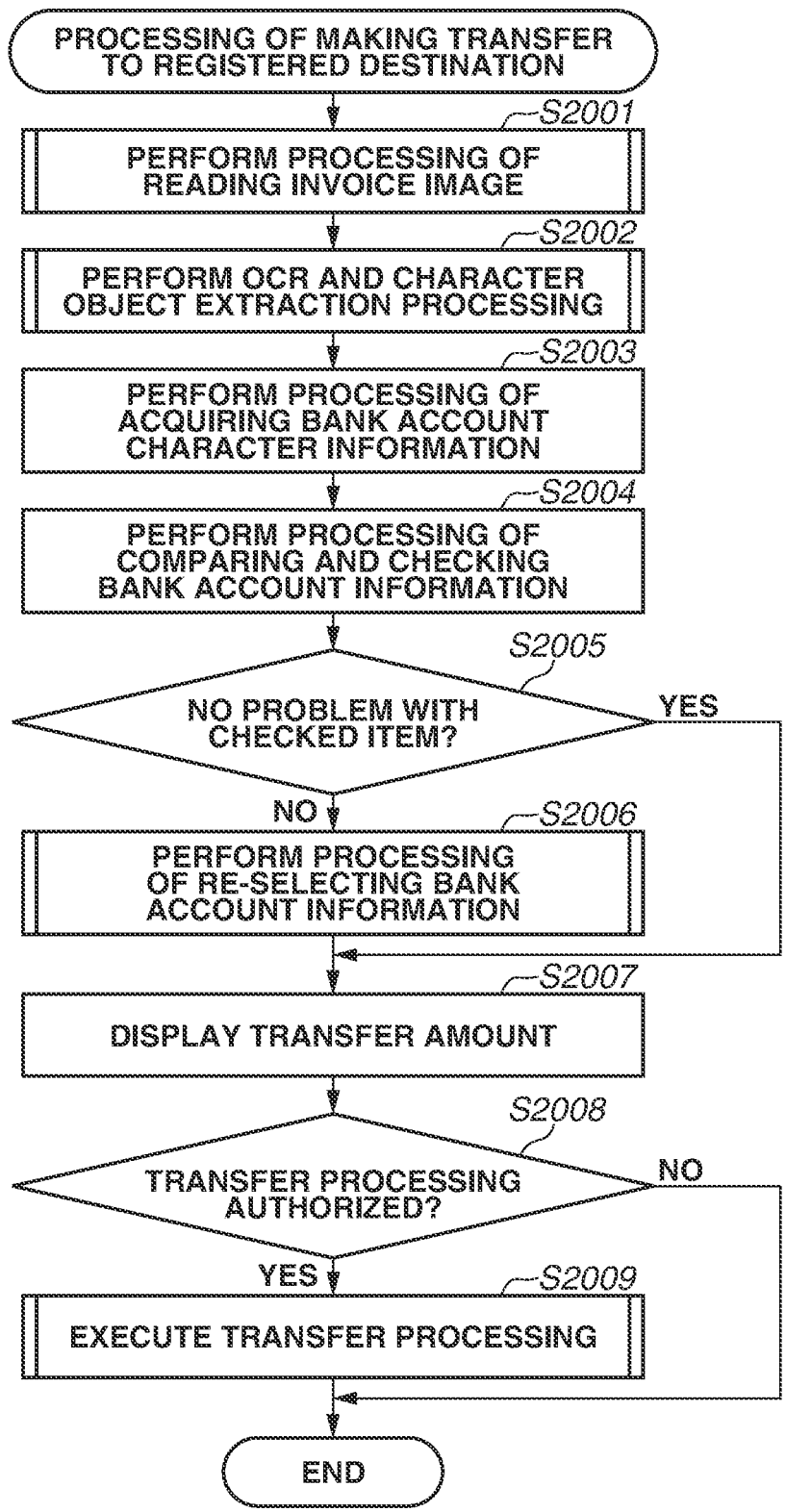
FIG. 20 is a flowchart illustrating the procedure of processing of making a transfer to a registered destination.

FIG. 20 illustrates processing performed when the shortcut icon 1701 for the registered transfer processing illustrated in FIG. 17 is selected. Each processing indicated in FIG. 20 is performed by the CPU 111 loading programs stored in the ROM 112 to the RAM 113 and running them.

FIG. 19 illustrates an example of an invoice set in the reading unit 118.

In step S2001, in response to a selection of the shortcut icon 1701 for the registered transfer processing, the CPU 111 causes the reading unit 118 to perform reading of the invoice.

In step S2002, after storing the invoice image data generated by reading the invoice in the RAM 113, the CPU 111 performs OCR and character object extraction processing on the invoice image data. Details of the OCR and the character object extraction processing are the same described in step S1003 in FIG. 9.

In step S2003, the CPU 111 acquires bank account information associated with the shortcut icon 1701 stored in the storage 114 and character position information about the bank account information.

In step S2004, the CPU 111 compares the character information generated by reading the characters at the position indicated by the character position information about the bank account information and character information about the bank account registered in the shortcut.

In step S2005, the CPU 111 determines, as the result of the comparison between the pieces of character information, whether those are identical.

If the CPU 111 determines that those are identical (YES in step S2005), the processing proceeds to step S2007. Otherwise (NO in step S2005), the processing proceeds to step S2006.

In step S2007, the CPU 111 causes the operation unit 116 to display the transfer amount.

In step S2006, the CPU 111 accepts the user's correction of the bank account information in processing of confirming the bank account information with the user.

In step S2007, the CPU 111 causes the operation unit 116 to display a screen which is illustrated in FIG. 21 displaying the transfer amount in the transfer information, and confirms that the transfer is to be made with the user. In step S2008, the CPU determines whether the user presses "CONFIRM" on the screen for displaying the transfer amount in the transfer information. If the user presses the "CONFIRM" (YES in step S2008), the processing proceeds to step S2009, and the CPU 111 makes the transfer processing in FIG. 15. Otherwise (NO in step S2008), the CPU 111 cancels and ends the processing.

Figure 22:
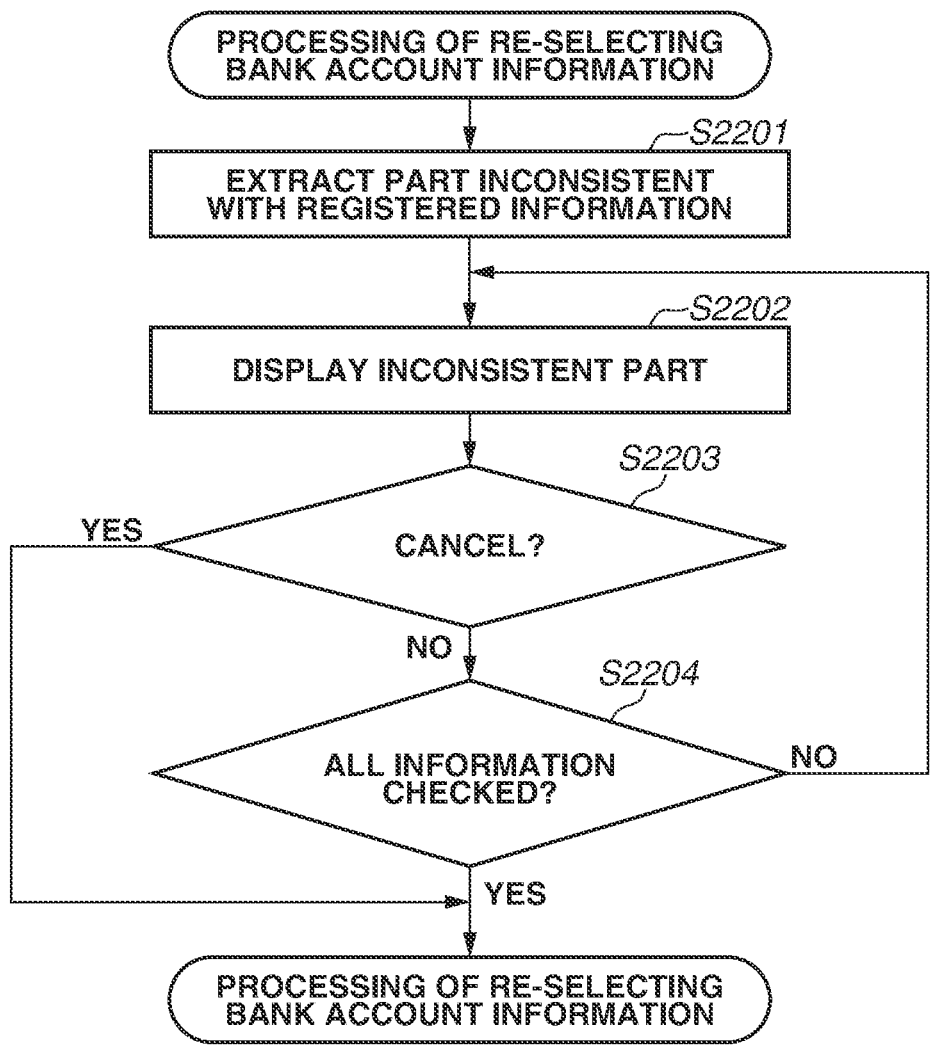
FIG. 22 is a flowchart illustrating the procedure of processing of re-selecting bank account information.

FIG. 22 illustrates the processing of confirming the bank account information with the user in step S2006 of the transfer processing in FIG. 20.

In step S2201, the CPU 111 extracts the inconsistent parts between the registered information and the extracted character object.

In step S2202, the CPU 111 causes the operation unit 116 to display an inconsistent part display screen (FIG. 23) regarding the inconsistent part.

While the bank names are displayed on the screen illustrated in FIG. 23, the operation unit 116 displays a similar screen also for differences in other items such as the branch name and the bank account number extracted.

In step S2203, the CPU 111 determines whether a cancel button is pressed on the inconsistent part display screen illustrated in FIG. 23. If the cancel button is pressed (YES in step S2203), the CPU 111 ends processing of re-selecting bank account information and the transfer processing.

On the other hand, if a confirm button is pressed on the inconsistent part display screen (NO in step S2203), the processing proceeds to step S2204.

In step S2204, the CPU 111 determines whether all inconsistent parts have been checked. If the CPU 111 determines that all the inconsistent parts have been checked (YES in step S2204), the processing ends and returns to the transfer processing. If the CPU 111 determines that there any unchecked part remains (NO in step S2204), the processing proceeds to S2202. In step S2202, the CPU 111 causes the operation unit 116 to display an inconsistent part display screen showing another inconsistent part.

According to the present exemplary embodiment, the above described configuration enables transfer processing through identification of transfer information regarding a transfer destination and a transfer amount based on the result of character recognition processing through reading documents.

In addition, character information regarding a transfer destination and position information about the character information are acquired from invoice image data. Making a transfer to the transfer destination based on the acquired character information via a web API while registering the transfer destination in a shortcut enables re-use of the transfer destination information.

Comparing the information registered in the shortcut and the character information about read image data enables determination of whether there is a difference from the format used when the invoice was registered, allowing avoidance of a transfer error.

While transfers through the Internet have been made in recent years, web APIs allow transfer processing instead of using a web browser. A web API cannot acquire financial institution names, branch names, and account numbers even if they are notified unlike transfers made via automatic teller machine (ATM) networks or web browsers. Furthermore, web APIs cannot acquire the name of an account holder as a transfer destination associated with a financial institution name, an account number, and other information stored in a host computer of a financial institution. Under those conditions, a mistake about a financial institution name, a branch name, an account type, or an account number will cause the transfer to be made to an incorrect transfer destination. In addition, the positions of a financial institution name, a branch name, an account type, and an account number vary in typical invoices depending on the format of the issuer of the invoice unlike account transfer request forms. Those situations cause the check and entry of a financial institution name, a branch name, an account type, an account number, and a billing amount before a transfer is made every time an invoice is received. According to the present exemplary embodiment, however, character information regarding a transfer destination or the like and position information about the character information are acquired from invoice image data or the like. In addition, making transfers to transfer destinations from acquired character information via web APIs while registering the transfer destinations in shortcuts enables re-use of transfer destination information. Comparison of the information registered in a shortcut with the character information about read image data enables determination of whether there is a difference from the format used when the invoice was registered, allowing avoidance of a transfer error.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-018367, filed Feb. 8, 2021, which is hereby incorporated by reference herein in its entirety.

What is claimed is:

1. An image processing apparatus comprising:
a reader configured to read a document;
one or more memories storing instructions; and
one or more processors executing the instructions to cause the image processing apparatus to function as:
a processing unit configured to perform character recognition processing of recognizing characters included in an image of the document read by the reader;
an identification unit configured to identify transfer destination information regarding a transfer destination and a transfer amount from a result obtained by the character recognition processing performed by the processing unit;
a transmission unit configured to transmit the transfer destination information regarding the transfer destination and the transfer amount which are identified by the identification unit;
a storage unit configured to store the transfer destination information regarding the transfer destination, wherein the storage unit is configured to store the transfer destination information regarding the transfer destination transmitted by the transmission unit and position information about a position where the transfer destination information is obtained through the character recognition processing; and
an object display unit configured to cause a display to display an object to call the transfer destination information regarding the transfer destination stored in the storage unit,
wherein in a case where the object is selected by a user, and transfer destination information regarding a new transfer destination obtained through the character recognition processing at the position indicated by the position information about an image of a new document read by the reader and the transfer destination information regarding the transfer destination stored in the storage unit are matched, the image processing apparatus causes the display to display information for transfer processing based on the new document, and
wherein, in a case where the object is selected by the user, the transfer destination information regarding the new transfer destination obtained through the character recognition processing at the position indicated by the position information about the image of the new document read by the reader and the transfer destination information regarding the transfer destination stored in the storage unit are not matched, the image processing apparatus makes a notification of an error.

2. The image processing apparatus according to claim 1, wherein the image processing apparatus further causes the display to displays the result obtained by the character recognition processing performed by the processing unit, wherein, after the result is displayed by the display, the transmission unit is configured to transmit the transfer destination information regarding the transfer destination and the transfer amount which are identified by the identification unit.

3. The image processing apparatus according to claim 2, further comprising an operation panel that receives selection of the transfer destination information regarding the transfer destination and the transfer amount from the result displayed by the display, wherein the identification unit is configured to identify the transfer destination information regarding the transfer destination and the transfer amount based on the selection received by the operation panel.

4. The image processing apparatus according to claim 1, wherein the one or more processors executing the instructions further causes the image processing apparatus to function as a registration unit configured to register authentication information about a server as a transmission destination to which the transmission unit transmits the transfer destination information regarding the transfer destination and the transfer amount.

5. The image processing apparatus according to any one of claim 1, wherein the transfer destination information regarding the transfer destination includes a bank name.

6. The image processing apparatus according to claim 1, wherein the transfer destination information regarding the transfer destination includes an account type.

7. The image processing apparatus according to claim 1, wherein the transfer destination information regarding the transfer destination includes an account number.

8. A control method for an image processing apparatus, the method comprising:
reading a document;
performing character recognition processing of recognizing characters included in an image of the read document;
identifying transfer destination information regarding a transfer destination and a transfer amount from a result obtained by the performing;
transmitting the identified transfer destination information regarding the transfer destination and the identified transfer amount;
storing the transfer destination information regarding the transfer destination, wherein the storage unit is configured to store the transfer destination information regarding the transfer destination transmitted by the transmission unit and position information about a position where the transfer destination information is obtained through the character recognition processing; and
displaying an object to call the stored transfer destination information regarding the transfer destination,
wherein in a case where the object is selected by a user, and transfer destination information regarding a new transfer destination obtained through the character recognition processing at the position indicated by the position information about an image of a new document read by the reader and the transfer destination information regarding the transfer destination stored in the storage unit are matched, the image processing apparatus causes the display to display information for transfer processing based on the new document, and
wherein, in a case where the object is selected by the user, the transfer destination information regarding the new transfer destination obtained through the character recognition processing at the position indicated by the position information about the image of the new document read by the reader and the transfer destination information regarding the transfer destination stored in the storage unit are not matched, the image processing apparatus makes a notification of an error.

9. A non-transitory computer readable storage medium storing a computer program that causes a computer to execute a control method for an image processing apparatus, the method comprising:
reading a document;
performing character recognition processing of recognizing characters included in an image of the read document;
identifying transfer destination information regarding a transfer destination and a transfer amount from a result obtained by the performing;
transmitting the identified transfer destination information regarding the transfer destination and the identified transfer amount;
storing the transfer destination information regarding the transfer destination, wherein the storage unit is configured to store the transfer destination information regarding the transfer destination transmitted by the transmission unit and position information about a position where the transfer destination information is obtained through the character recognition processing; and
displaying an object to call the stored transfer destination information regarding the transfer destination,
wherein in a case where the object is selected by a user, and transfer destination information regarding a new transfer destination obtained through the character recognition processing at the position indicated by the position information about an image of a new document read by the reader and the transfer destination information regarding the transfer destination stored in the storage unit are matched, the image processing apparatus causes the display to display information for transfer processing based on the new document, and
wherein, in a case where the object is selected by the user, the transfer destination information regarding the new transfer destination obtained through the character recognition processing at the position indicated by the position information about the image of the new document read by the reader and the transfer destination information regarding the transfer destination stored in the storage unit are not matched, the image processing apparatus makes a notification of an error.

* * * * *